United States Patent
Culy et al.

(10) Patent No.: US 7,249,019 B2
(45) Date of Patent: Jul. 24, 2007

(54) METHOD AND APPARATUS FOR PROVIDING AN INTEGRATED SPEECH RECOGNITION AND NATURAL LANGUAGE UNDERSTANDING FOR A DIALOG SYSTEM

(75) Inventors: Christopher Culy, Mountain View, CA (US); David J. Israel, Palo Alto, CA (US); James F. Arnold, Helena, MT (US)

(73) Assignee: SRI International, Menlo Park, CA (US)

( * ) Notice: Subject to any disclaimer, the term of this patent is extended or adjusted under 35 U.S.C. 154(b) by 733 days.

(21) Appl. No.: 10/213,362

(22) Filed: Aug. 6, 2002

(65) Prior Publication Data

US 2004/0030557 A1 Feb. 12, 2004

(51) Int. Cl.
*G10L 15/18* (2006.01)
*G10L 15/26* (2006.01)
*G06F 17/27* (2006.01)

(52) U.S. Cl. .................. 704/257; 704/9; 704/235; 704/251; 704/270.1

(58) Field of Classification Search ............ 704/270.1, 704/231, 246, 7, 251
See application file for complete search history.

(56) References Cited

U.S. PATENT DOCUMENTS

| | | | |
|---|---|---|---|
| 4,984,178 A | 1/1991 | Hemphill et al. ........ 364/513.5 |
| 5,237,502 A * | 8/1993 | White et al. ................... 704/1 |
| 5,642,519 A | 6/1997 | Martin .......................... 395/759 |
| 6,269,336 B1 | 7/2001 | Ladd et al. .................. 704/270 |
| 6,385,583 B1 | 5/2002 | Ladd et al. .................. 704/270 |
| 6,513,063 B1 * | 1/2003 | Julia et al. ................... 709/219 |
| 6,801,604 B2 * | 10/2004 | Maes et al. ............... 379/88.17 |
| 6,832,196 B2 * | 12/2004 | Reich ....................... 704/270.1 |
| 7,003,463 B1 | 2/2006 | Maes et al. .............. 704/270.1 |
| 2001/0041980 A1 | 11/2001 | Howard et al. ............. 704/270 |
| 2002/0032564 A1 * | 3/2002 | Ehsani et al. ............... 704/235 |
| 2002/0042711 A1 * | 4/2002 | Lin ............................. 704/257 |
| 2002/0169806 A1 * | 11/2002 | Wang et al. ................. 707/541 |
| 2002/0184373 A1 * | 12/2002 | Maes .......................... 709/228 |
| 2003/0171926 A1 * | 9/2003 | Suresh et al. ............ 704/270.1 |

OTHER PUBLICATIONS

Joshi et al., Tree-Adjoining Grammars, 1997, Department of computer and Information Science, University oo Pensylvania, vol. 3, pp. 69-124.*
Andrew Haas, A Generalizarion of The Offline Parsable Grammars, 1989, Association for Computational Linguistics, pp. 237-242.*
Srinivasan, et al., "Is Speech Recognition Becoming Mainstream?," Computer, Apr. 2002, p. 38-41.
Padmanabham, et al. "Large-Vocabulary Speech Recognition Algorithms," Computer, Apr. 2002, 42-50.
Gorin, et al., "Automated Natural Spoken Dialog," Computer, Apr. 2002, p. 51-56.
Moreno, et al. "From Multimedia Retrieval to Knowledge Management," Computer, Apr. 2002, p. 58-66.

* cited by examiner

*Primary Examiner*—Tālivaldis Ivas Šmits
*Assistant Examiner*—Abdelali Serrou
(74) *Attorney, Agent, or Firm*—Patterson & Sheridan, LLP; Kin-Wah Tong, Esq.

(57) ABSTRACT

An apparatus and a concomitant method for natural language understanding. In one embodiment, the present invention provides a new architecture that employs a sophisticated natural language understanding parser in conjunction with a speech recognition component and a VoiceXML application.

40 Claims, 5 Drawing Sheets

METHOD AND APPARATUS FOR PROVIDING AN INTEGRATED SPEECH RECOGNITION AND NATURAL LANGUAGE UNDERSTANDING FOR A DIALOG SYSTEM

The present invention relates to an apparatus and concomitant method for speech-based applications/spoken language applications. More specifically, the present invention provides a new architecture that employs a sophisticated natural language understanding parser in conjunction with a speech recognition component and a VoiceXML application.

BACKGROUND OF THE DISCLOSURE

Speech has been viewed as a promising interface over the traditional keyboard and mouse. With wide acceptance of portable devices such as PDAs and cell phones that employ very small input interfaces, a more robust interface is needed to allow a user to access the ever growing pool of content and information that is accessible via a telephone or a portable device.

However, the very nature of a portable device is its convenience, which typically requires the portable device to be relatively small in physical size. Unfortunately, such requirements often constrain the processing power and the characteristics of input/output interfaces on a portable device. For example, it is generally impractical to provide a physical keyboard on a cell phone. Although an electronic keyboard can be displayed on a screen as in a PDA, such a user interface is unwieldy in performing complex tasks. Additionally, the user may be distracted while operating the portable device in this way, e.g., while operating a vehicle.

Thus, a speech-driven user interface is very desirable. To address this need, the VoiceXML Forum developed the Voice extensible Markup Language (VoiceXML) which is a new computer language that can be used to create audio dialogs that feature synthesized speech, digitized audio, recognition of spoken and touchtone key input, recording of spoken input, telephony, and mixed-initiative conversations.

Figure 1:
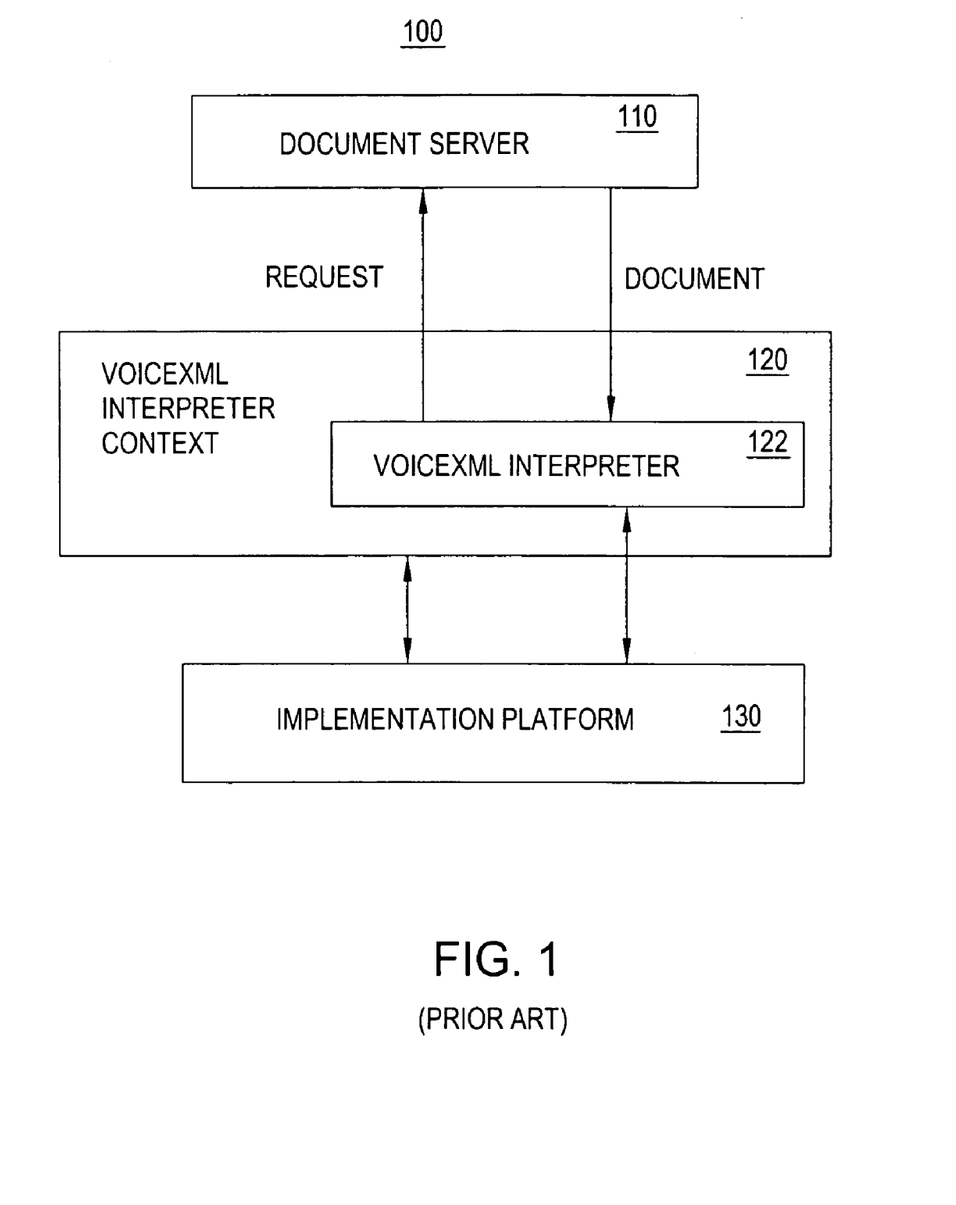
FIG. 1 illustrates a block diagram of a standard VoiceXML architecture model.

FIG. 1 illustrates a traditional VoiceXML architectural model 100 for integrating voice services with data services. A voice service is a sequence of interaction dialogs between a user and the implementation platform 130. In turn, the implementation platform 130 is controlled by the VoiceXML interpreter context 120 and the VoiceXML interpreter 122. The implementation platform 130 generates events that are in response to user actions, e.g., spoken or character inputs. These events are then acted upon by the VoiceXML interpreter context 120 or the VoiceXML interpreter 122 as specified by the "VoiceXML document". Namely, a VoiceXML document specifies each interaction dialog that a VoiceXML interpreter conducts. Finally, the document server 110 (e.g., a Web server), processes requests from the VoiceXML interpreter and produces the requested documents or additional VoiceXML documents to continue the user's session.

In practice, the standard VoiceXML model for a dialog system consists of some number of speech recognition (SR) grammars competing to recognize the user's utterances. The recognized utterance and the identity of the SR grammar which best recognized the utterance are returned to the VoiceXML application (i.e., the VoiceXML interpreter), where control flow through the application is (partially) dictated by which grammar did the recognition.

However, the standard VoiceXML model has two drawbacks pertaining to the nature and number of speech recognition grammars. First, the VoiceXML model typically employs small rule-driven speech recognition grammars that are less robust than non-rule-driven statistical language models.

Second, the standard VoiceXML model has a limited number of SR grammars competing to recognize a current utterance. These grammars are typically small in size and typically only a small number of them are competing at any one time. The result of the small size and small number of SR grammars is that VoiceXML applications are generally not very flexible. Users are limited in what they can say to a small number of phrases, and they can only say those phrases when the system is expecting them.

Therefore, a need exists for a speech recognition and natural language understanding dialog system within the context of a VoiceXML environment that provides sufficient flexibility to handle a wide variety of user utterances and is capable of understanding any of the utterances at any time.

SUMMARY OF THE INVENTION

The present invention is an apparatus and a concomitant method for spoken language applications. In one embodiment, the present method involves a distributed speech recognition system that provides speech-driven control and remote service access.

In one embodiment, a sophisticated parser is incorporated into a VoiceXML architectural model. Specifically, the sophisticated parser in conjunction with a grammar employs "beyond context free grammar (CFG)" formalism. The novel approach passes the results of the speech recognizer as returned to the VoiceXML interpreter or browser and passes them, e.g., via an external function call, to a full natural language parser. In turn, the parser returns its more complex meaning representation (semantic representation) back to the VoiceXML browser to act on. Thus, the VoiceXML browser has inputs from both the speech recognizer of the implementation platform and from the full natural language parser.

In an alternate embodiment, the novel approach interposes the natural language parser between the speech recognizer and the VoiceXML browser. In other words, the output of the speech recognizer is passed directly to the parser instead of being passed to the VoiceXML browser. The parser processes the speech recognizer output, and returns its more complex meaning representation to the VoiceXML browser, which need not see the output of the speech recognizer.

There are several advantages to this interposition approach. One advantage is that the choice of number of speech recognition grammars can be made based solely on considerations of optimal speech recognition. Another advantage of the interposition approach is that it allows for a closer connection between the speech recognizer and the parser, e.g., allowing the speech recognizer to receive feedback from the parser.

In the embodiments described above, the full natural language parser can be implemented in accordance with "beyond CFG" formalism. This broad category covers several classes of grammar formalism: feature-based unification grammar, general rewrite grammar, tree adjoining grammar (TAG) and probabilistic grammar. In the description below, the present invention is disclosed in view of the Gemini system as disclosed by SRI International of Menlo Park, Calif. The Gemini system is a natural language parsing and semantic interpretation system based on the feature-based unification grammar formalism.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 2:
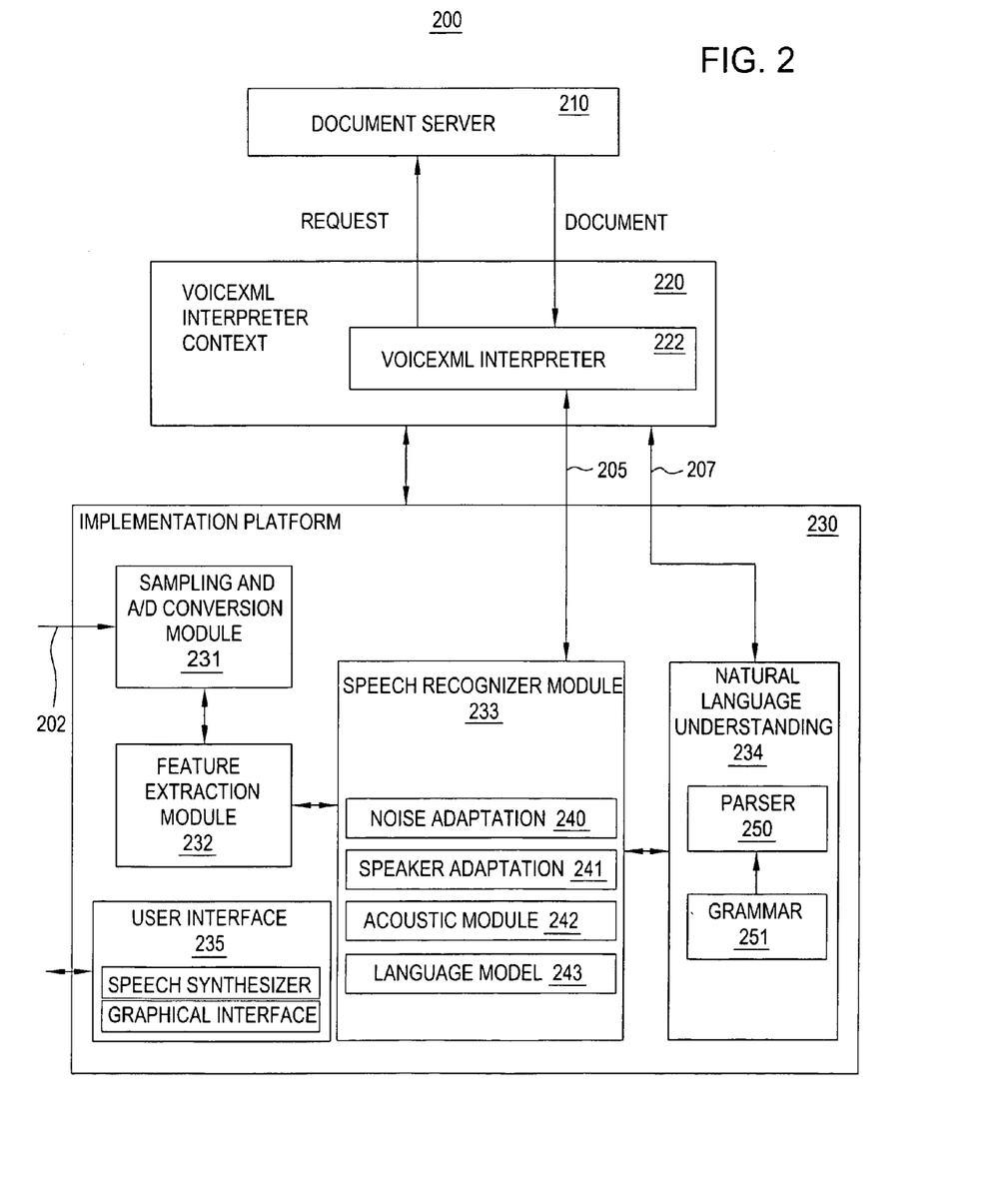
FIG. 2 illustrates a block diagram of a speech recognition and natural language understanding dialog system of the present invention.

FIG. 2 illustrates a block diagram of a speech recognition and natural language understanding dialog system 200 of the present invention. In the present invention, the speech recognition and natural language understanding dialog system 200 is implemented in the context of a VoiceXML environment, i.e., the implementation platform communicates with a VoiceXML interpreter or browser. Specifically, speech recognition and natural language understanding dialog system 200 comprises an implementation platform 230, a VoiceXML interpreter context 220 and a document server 210. The system 200 is designed to provide speech-driven control and remote service access of documents located on the document server 210.

Figure 6:
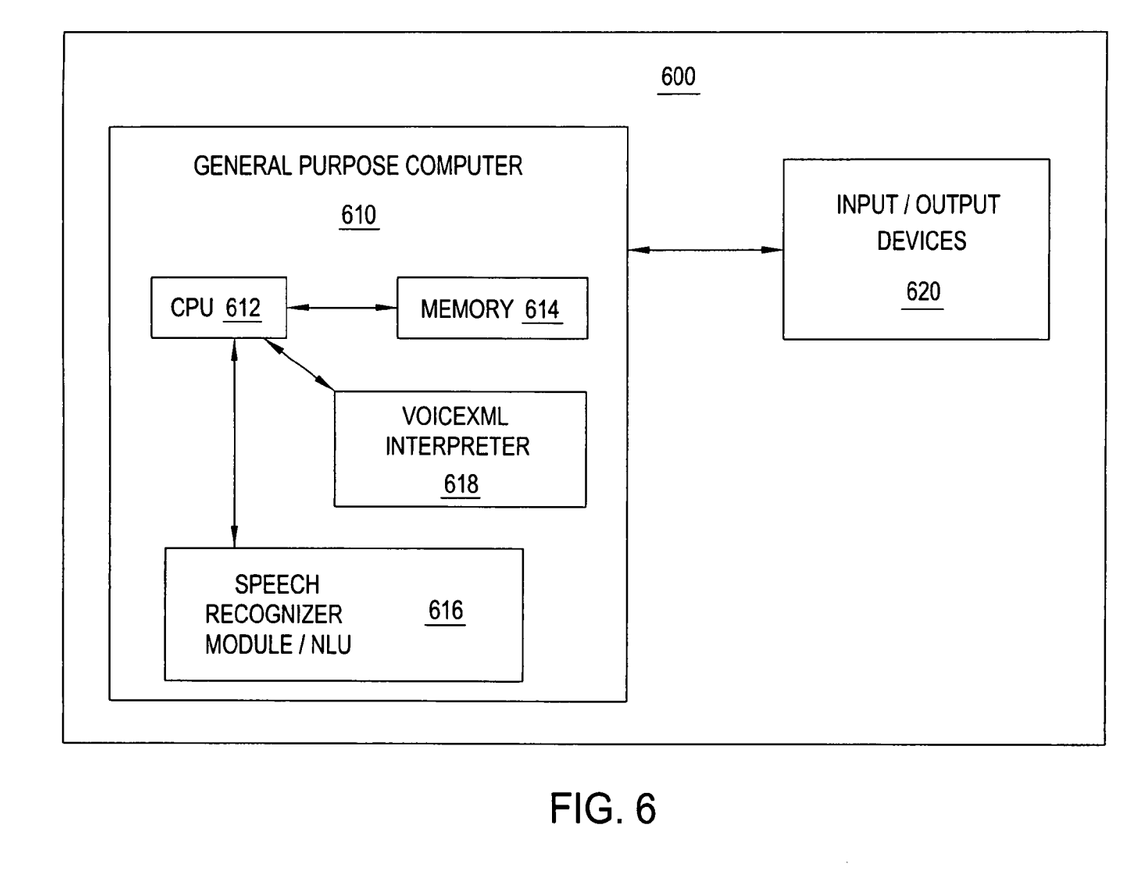
FIG. 6 illustrates a block diagram of a speech recognition and natural language understanding dialog system of the present invention as implemented using a general purpose computer.

In one embodiment, each of the implementation platform 230, the VoiceXML interpreter context 220 and the document server 210 can be implemented using a general purpose computer or any other hardware equivalents as shown in FIG. 6 below. The implementation platform 230 can be implemented as a portable device or a larger computer system, e.g., a desktop computer or server, an office PBX and the like as required in a particular application.

The implementation platform may comprise a sampling and Analog-to-Digital (A/D) conversion module 231, a feature extractor or feature extraction module 232, a speech recognizer or a speech recognizer module 233, a natural language understanding module 234, and various Input/Output (I/O) or user interface devices 235, e.g., a speech synthesizer, a graphical user interface, a microphone (not shown), an audio speaker (not shown) and the like. In operation, an input audio signal (e.g., a speech signal) on path 202 is received by the sampling and Analog-to-Digital (A/D) conversion module 231, where the input signal is sampled and digitized from a microphone into a sequence of samples that are later processed by a processor.

The digitized sequence of samples is then forwarded to the feature extraction module 232. The sample sequence is first grouped into frames (commonly 1 centi-second in length) and speech features are extracted for each of the frames using various signal processing methods. Some examples of these are Mel-cepstral features, or PLP cepstral features.

Specifically, conventional feature extraction methods for automatic speech recognition generally rely on power spectrum approaches, whereby the acoustic signals are generally regarded as a one dimensional signal with the assumption that the frequency content of the signal captures the relevant feature information. This is the case for the spectrum representation, with its Mel or Bark variations, the cepstrum, FFT-derived (Fast Fourier Transform) or LPC-derived (Linear Predictive Coding), LPC derived features, the autocorrelation, the energy content, and all the associated delta and delta-delta coefficients.

Cepstral parameters are effectively used for efficient speech and speaker recognition. Originally introduced to separate the pitch contribution from the rest of the vocal cord and vocal tract spectrum, the cepstrum has the additional advantage of approximating the Karhunen-Loeve transform of speech signal. This property is highly desirable for recognition and classification. In one embodiment of the present invention, the speech features generated by the feature extraction module 232 can be Mel-cepstral features, or PLP cepstral features.

It should be noted that the present invention is not limited to a particular type of feature, as long as the same features are used to train the models and used during the recognition process. Namely, the present invention is not feature dependent.

In turn, the speech recognizer 233 receives the speech features and is able to decode the "recognized text" from the speech features using various models as discussed below. It should be noted that FIG. 2 when viewed with the discussion provided below, also serves as a flowchart for the present novel method. Additionally, the grouping of modules in FIG. 2 is only illustrative, such that the grouping can be altered in accordance with a particular implementation.

The speech recognizer 233 typically comprises a text decoder or extractor (not shown), acoustics model(s) 242 and a language model 243. Specifically, the input speech features obtained from the utterance (input audio signal) are decoded using the acoustic models 242 and a language model 243. The acoustic models are trained using a large amount of training speech. Typically, acoustic models are Hidden Markov Models (HMMs) trained for each sound unit (phone, triphone, etc.). Each HMM usually has 3 states and each state may be modeled using one or more gaussians. Some of the states may be tied by sharing the same gaussians. The HMM techniques are used to identify the most likely sequence of words that could have produced the speech signal.

However, one problem with the HMM based speech recognition is the mismatch between the speech data used for training and during testing/use. Typical training data is obtained under controlled environments that are noise free. However, the test speech is obtained in real world conditions which are usually noisy. This mismatch leads to a loss in performance. Thus, the present invention may optionally incorporate a noise adaptation module 240 to compensate for the mismatch.

Numerous noise adaptation methods are available. For example, a noise adaptation method is disclosed in US patent application entitled "Method And Apparatus For Recognizing Speech In A Noisy Environment", filed on Aug. 15, 2001 with a Ser. No. 09/930,389, which is commonly assigned to the assignee of this application and is hereby incorporated in its entirety by reference.

The language model 243 may incorporate a variety of knowledge sources, e.g., syntactic knowledge and semantic knowledge. Syntactic knowledge is defined as pertaining to the combination of words to form grammatically correct strings such as sentences or phrases. Semantic knowledge is defined as pertaining to the understanding of the task domain so as to be able to validate sentences or phrases that are consistent with the task being performed, or which are consistent with previously decoded sentences. Often, when only syntactic constraints are used, the language model is called a "grammar". A large vocabulary speech-recognition system, with a simple acoustic command-and-control model, is critically dependent on linguistic information embedded in the input speech. As such, for large vocabulary speech recognition, incorporation of knowledge of the language, in the form of a "statistical language model", is essential.

Finally, the top-level user request is identified by the natural language understanding module 234. Specifically, natural language understanding module 234 may incorporate semantic knowledge and pragmatic knowledge resources. Pragmatic knowledge pertains to knowledge of the task or other contextual information that is used, for example, in resolving ambiguity. Namely, natural language understanding module 234 incorporates a natural language parser 250 and a grammar 251 to extract meaning from a recognized utterance generated by the speech recognizer 233. As further discussed below, the parser 250 and grammar 251 are implemented in accordance with "beyond CFG" formalism.

This broad category covers several classes of grammar formalism: feature-based unification grammar, general rewrite (or "recursively enumerable") grammar and tree adjoining grammar (TAG). A good description of the general rewrite (or "recursively enumerable") grammar can be found in "Introduction to Automata Theory, Languages, and Computation", by J. Hopcroft and J. Ullman, Addsion-Wesley Publishing, 1979. Similarly, a good description of the tree adjoining grammar (TAG) can be found in "Introduction to tree adjoining grammars", by Joshi, Technical Report MS-CIS-86-64, Dept. of Computer and Information Science, Univ. of Pennsylvania, 1986. These references are herein incorporated by reference.

Those skilled in the art will realize that there are different implementations of parsers that employ "beyond CFG" formalism. Although the present invention is described below with reference to a feature-based unification grammar, those skilled in the art will realize that the present invention can be adapted to operate with any parsers that employ "beyond CFG" formalism.

Thus, a natural language parser 250 is incorporated into a VoiceXML architectural model. Specifically, the novel approach passes the results of speech recognizer 233 as returned to the VoiceXML interpreter or browser and passes them, e.g., via an external function call, to the natural language parser 250. In turn, the parser on path 207 returns its more complex meaning representation (semantic representation) back to the VoiceXML browser to act on. Thus, the VoiceXML browser has inputs from both the speech recognizer of the implementation platform via path 205 and inputs from the sophisticated parser via path 207.

More specifically, understanding of an utterance in a traditional VoiceXML model is handled partly external to the speech recognition grammar, via the location of the input in the flow of the VoiceXML application, and partly internal to the speech recognition grammar, via "slots" which return certain types of information to the VoiceXML application (e.g. names, addresses, etc). Unfortunately, prior art statistical grammars generally do not generate "slotted" output suitable for return to a VoiceXML Interpreter or browser.

To address this need, the present natural language understanding module 234 employs a parser 250 and an associated grammar 251 in accordance with "beyond CFG" formalism. In one embodiment, the present invention is implemented using the feature-based unification grammar formalism, e.g., as disclosed in the Gemini system of SRI International.

Figure 4:
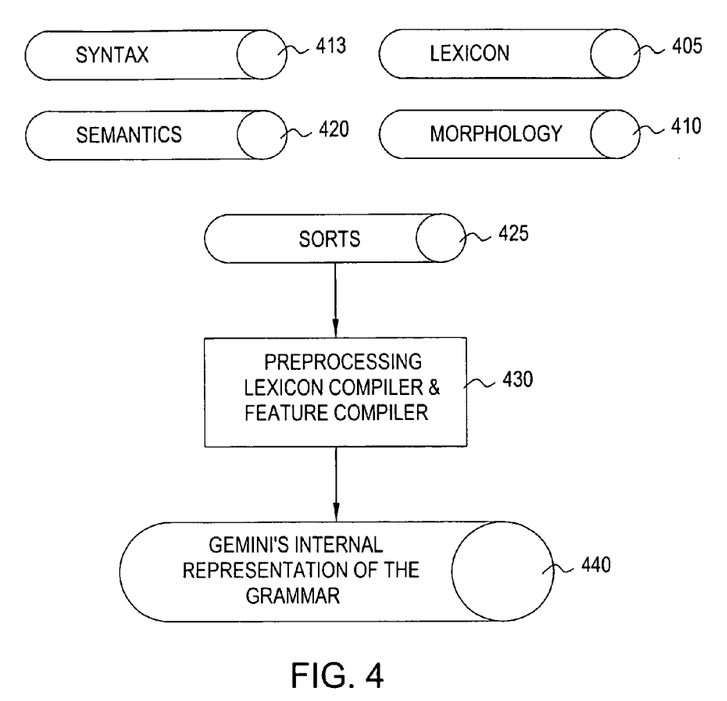
FIG. 4 illustrates a block diagram of a preprocessing stage to produce a feature-based unification grammar.

FIG. 4 illustrates a block diagram of a preprocessing stage to produce a feature-based unification grammar. Specifically, the components of the grammar, in terms of knowledge bases, include a lexicon file 405, a morphology file 410, a syntax file 415 and a semantics file 420.

The lexicon file 405 is a file that contains lists of English words and their crucial syntactic features. To illustrate, "Mary" is a personal first name, typically female and that "walk" is a regular verb and that it has both transitive (as in "He walked the dog.") and intransitive versions.

The morphology file 410 contains information about the syntactically and semantically meaningful suffixes (and in other languages prefixes) of words. For example, it may contain the information that regular verbs in English follow rules such as that the third person singular form involves adding an 's', i.e., "I walk, you walk, Mary walks" and the progressive form adds an "-ing". Additionally, this file also contains rules such as the past tense of the verb "run" is "ran", and not "ranned" and so on.

The syntax file 415 contains the set of grammatical rules that describe and characterize well-formed phrases of the language (e.g., English). To illustrate, one such rule states that a sentence (S) may consist of a noun phrase (NP) followed by a verb phrase (VP). This rule is often expressed in a formalism that looks like:

$$S \rightarrow NP\ VP.$$

Additionally, many languages require that the NP and the VP agree in number (so that "Mary is walking" is in proper form, as is "They are walking"). This relatively simple constraint is an apt place to introduce the notion of feature-based unification grammar formalism.

First, rules with a form like the following:

$$S \rightarrow NP\ VP$$

$$VP \rightarrow V\_Intrans$$

are context-free (CF) rules. In such rules, the constituents ("S", "NP", "VP", "V_Intrans") are atomic, simple symbols (called nonterminals; whereas terminal items can be thought of as the words themselves). The term "atomic", pertaining to the formalism, indicates that the constituents, e.g., NP and VP, are two distinct nonterminals with no part in common.

Additionally, in a context-free grammar, there is only one nonterminal on the left side of the grammar rule or "production", but there is no restriction on the right side of the grammar rule. That is, the right side can consist of any sequence (empty or non-empty) of nonterminals and terminals, in any order. Thus, the following is an acceptable form:

$$A \rightarrow wBw',$$

where A and B are nonterminal symbols and w, and w' are terminals, e.g., words.

In a simple CF grammar (CFG), one would have to state the rules about number agreement in the following way:

S→NP_sing VP_sing

S→NP_pl VP_pl where "sing" indicates singular and "pl" indicates plural. Of course once one has introduced this bifurcation of types of NP's and VP's, this diffuses throughout the grammar. Thus, the VP rules would have to be replaced:

VP_sing V_sing_Intrans

VP_pl→V_pl_Intrans.

This multiplication of types and rules quickly becomes unwieldy in any realistic-sized grammar. Consider, for example, the problems posed by personal pronouns, "I", "we", "you", "he", "she", "it" and "they" (singular and plural). The constraint is now about agreement between person and number. To address this constraint, the rules may take the following form:

S→NP_first_singular VP_first_singular

S→NP_first_plural VP_first_plural

In contrast, using a feature-based unification grammar formalism, one can cover the phenomena in a much simpler, more expressive, hence more compact manner. In such formalisms, one allows for complex nonterminals, where the complexity comes in the form of feature annotation on the nonterminals. So in such a grammar, one can state all the rules for number and person agreement in the following single rule:

S→NP:[person=P, number=N]VP:[person=P, number=N]

where "P" and "N" are variables and the set of equations constitute a feature constraint, i.e., for this example, the person and number of the NP must be same as that of the VP. When such a rule is applied to, e.g., "I am walking", the features of the noun phrase are set to: person-first, number-sing and this forces that of the verb to be set to the same values. The information that "I" is first person singular is in the lexicon and that the first person singular form of (the present tense of) "be" is "am" is in the morphology.

Such formalisms allow for nonatomic symbols, in particular for symbols that contain sets of equations as constituents. That is, the basic form of a symbol in such a formalism is a pair whose first component is a terminal or nonterminal and whose second component is a set of equations. Unification-based formalisms allow for the description of all recursively enumerable (general rewrite) languages, such that they allow for grammars well beyond the power and complexity of Context-Free grammars.

The semantics file 420 contains understanding of the task domain so as to be able to validate sentences (or phrases) that are consistent with the task being performed, or which are consistent with previously decoded sentences. Finally, the system may also contain sortal information file 425, where sortal information is attached to nouns and verbs, e.g., the nouns "professor" and "Mary" are attached to the sort "Person" and the nouns "dog" and "cat" are attached to the sort "Animal".

In turn, the components are complied in the preprocessing module 430 to produce a grammar, e.g., Gemini's internal representation of the grammar 440. This grammar is then applied by a corresponding parser to produce a semantic representation of a text signal. A good description of the feature-based unification grammar can be found in "Gemini: A natural language system for spoken-language understanding", by Dowding et al., in *Proceedings of the 31st Annual Meeting of the Assoc. for Computational Linguistics*, pp. 54-61, 1993, which is herein incorporated by reference.

Another family of formalisms, sometimes called tree (or tree grammar) formalisms, have rules that operate on labeled trees, rather than on sequences of symbols (atomic or nonatomic). Within that family are the Tree Adjoining Grammar (TAG) formalisms.

Another formalism is the recursively enumerable grammar formalism. Unlike the context-free grammar, there are no restrictions on both sides of the grammar rules as to the number of symbols and the length of such symbol sequence. That is, the right side and left side can consist of any sequence (empty or non-empty) of nonterminals and terminals, in any order without any restriction with regard to the length of the sequence.

Another formalism is the stochastic or probabilistic grammar formalisms, in which the grammar rules allow for labeling by probabilities. To illustrate, assume that there are just two rules for sentences, where rule one is a sentence that starts with a noun phrase followed by a verb phrase, and rule two is sentence that start with auxiliary verbs, as in "Did David lose his keys?" One can express the empirical finding that the former rule is used 3 times as often as the latter or is 3 times more probable as follows:

S→[0.75]NP VP

S→[0.25]Aux NP VP

This approach is again a unique method when applied in conjunction within the VoiceXML architecture. Since the probabilistic/stochastic approach can be applied to CFGs, there are also probabilistic/stochastic TAGs, feature-based unification systems, and so on.

Figure 5:
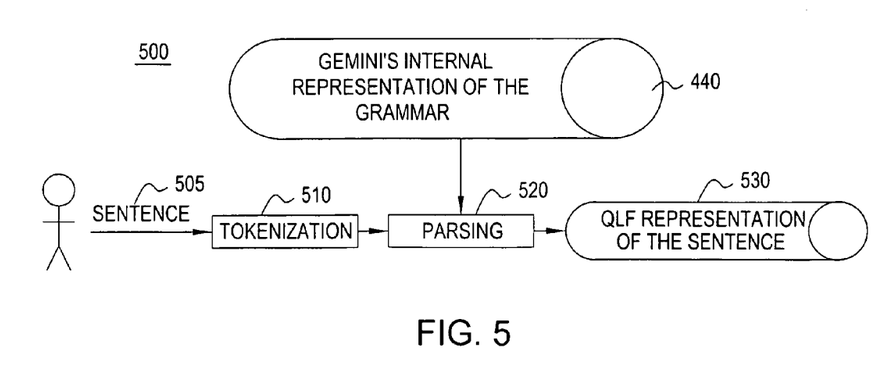
FIG. 5 illustrates a block diagram of a method for sentence comprehension.

FIG. 5 illustrates a block diagram of a method 500 for sentence comprehension. In the sentence comprehension method, a sentence 505, e.g., received from a speech recognizer module 233, is tokenized in step 510. It should be noted that the input from the speech recognizer module 233 may not take the form simply of a single sequence of words. For the purpose of illustration, such a sequence is assumed. For example, tokenization of the sentence "Mary is walking" should produce:

("Mary", "is", "walking").

In turn, the parsing step 520 seeks to describe/analyze the input sentence in terms of the feature-based unification grammar 440 (syntax and semantics) of the language. For example, parsing the Mary sentence will result in the form:

(sentence (agent (Mary, person)) (action walk) (tense present).

It should be noted that the above form is only illustrative. Thus, the natural language understanding module 234 identifies the constituent words with the use of the parser and grammar to produce a natural language independent casting of the sentence in what is called "quasi-logical form" (QLF) that will be used as the input to later stages, e.g., to a Dialogue Manager or the VoiceXML Interpreter 222. This output by the parser is referred to as a semantic representation, i.e., an unambiguous representation of the text signal to be passed to later stages of processing.

Figure 3:
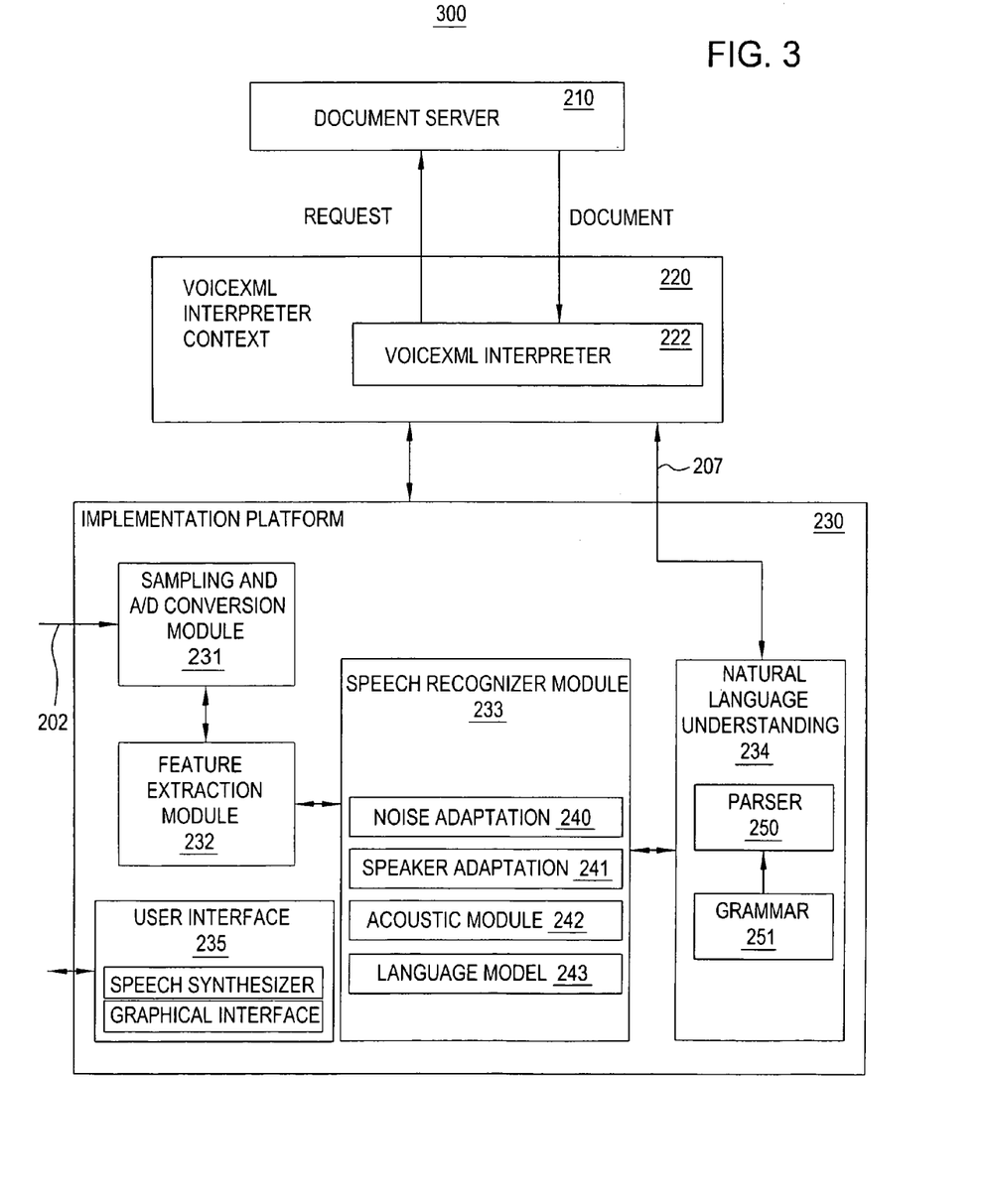
FIG. 3 illustrates a block diagram of an alternate speech recognition and natural language understanding dialog system of the present invention.

FIG. 3 illustrates a block diagram of an alternate speech recognition and natural language understanding dialog system 300 of the present invention. The system 300 is identical in structure to the system 200 of FIG. 2 with the exception of omitting the communication link 205 between the speech recognizer module 233 and the VoiceXML interpreter 222.

In other words, the output of the speech recognizer 233 is passed only to the parser 250 instead of being passed to the VoiceXML interpreter or browser 222. The parser 250 in conjunction with grammar 251 processes the speech recognizer output, and returns its more complex meaning representation to the VoiceXML browser 222, which need not see the output of the speech recognizer.

FIG. 6 illustrates a block diagram of a speech recognition system 600 of the present invention as implemented using a general-purpose computer. The speech recognition device or system 600 comprises a processor (CPU) 612, a memory 614, e.g., random access memory (RAM) and/or read only memory (ROM), a speech recognizer module 616 or, alternatively, managers of the central server 618, and various input/output devices 620, (e.g., storage devices, including but not limited to, a tape drive, a floppy drive, a hard disk drive or a compact disk drive, a receiver, a transmitter, a speaker, a display, a speech signal input device, e.g., a microphone, a keyboard, a keypad, a mouse, an A/D converter, and the like).

Namely, speech recognizer module/natural language understanding 616 can be the speech recognizer module 233 and natural language understanding module 234 of FIGS. 2 and 3 and VoiceXML interpreter 618 can be the VoiceXML interpreter 222 of FIGS. 2 and 3. It should be understood that the speech recognizer module 616 and VoiceXML interpreter 618 can be implemented as one or more physical devices that are coupled to the CPU 612 through a communication channel. Alternatively, the speech recognizer module 616 and VoiceXML interpreter 618 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 614 of the computer. As such, the speech recognizer module 616 and the VoiceXML interpreter 618 (including associated methods and data structures) of the present invention can be stored on a computer readable medium, e.g., RAM memory, magnetic or optical drive or diskette and the like. Additionally, it should be understood that various modules and models (e.g., feature extraction module, language models, acoustic models, speech synthesis module, translation module and its sub-modules) as discussed above or known in the art can be stored and recalled into memory 614 for execution.

Although various embodiments which incorporate the teachings of the present invention have been shown and described in detail herein, those skilled in the art can readily devise many other varied embodiments that still incorporate these teachings.

What is claimed is:

1. Method for performing natural language understanding, said method comprising the steps of:
   (a) receiving a speech signal from a user;
   (b) performing speech recognition on said speech signal to produce a text signal representative of words contained in the speech signal;
   (c) providing said text signal to a VoiceXML interpreter;
   (d) using a parser that employs a beyond context free grammar formalism to generate a semantic representation for said text signal; and
   (e) providing said semantic representation to said VoiceXML interpreter.

2. The method of claim 1, wherein said beyond context free grammar formalism includes a feature-based unification grammar.

3. The method of claim 2, wherein said feature-based unification grammar employs variables in defining a feature constraint.

4. The method of claim 2, wherein said feature-based unification grammar is a probabilistic feature-based unification grammar.

5. The method of claim 1, wherein said beyond context free grammar formalism includes a general rewrite grammar.

6. The method of claim 1, wherein said beyond context free grammar formalism includes a tree adjoining grammar (TAG).

7. The method of claim 6, wherein said tree adjoining grammar (TAG) is a probabilistic tree adjoining grammar.

8. The method of claim 1, wherein said beyond context free grammar formalism includes a probabilistic grammar.

9. Apparatus for performing natural language understanding, comprising:
   means for receiving a speech signal from a user;
   means for performing speech recognition on said speech signal to produce a text signal representative of words contained in the speech signal;
   means for providing said text signal to a VoiceXML interpreter;
   means for using a parser that employs a beyond context free grammar formalism to generate a semantic representation for said text signal; and
   means providing said semantic representation to said VoiceXML interpreter.

10. The apparatus of claim 9, wherein said beyond context free grammar formalism includes a feature-based unification grammar.

11. The apparatus of claim 10, wherein said feature-based unification grammar employs variables in defining a feature constraint.

12. The apparatus of claim 10, wherein said feature-based unification grammar is a probabilistic feature-based unification grammar.

13. The apparatus of claim 9, wherein said beyond context free grammar formalism includes a general rewrite grammar.

14. The apparatus of claim 9, wherein said beyond context free grammar formalism includes a tree adjoining grammar (TAG).

15. The apparatus of claim 14, wherein said tree adjoining grammar (TAG) is a probabilistic tree adjoining grammar.

16. The apparatus of claim 9, wherein said beyond context free grammar formalism includes a probabilistic grammar.

17. Apparatus for performing natural language understanding, comprising:
   a speech recognizer for performing speech recognition on a speech signal to produce a text signal representative of words contained in the speech signal;
   a parser that employs a beyond context free grammar formalism to generate a semantic representation for said text signal; and
   a VoiceXML interpreter for receiving said text signal and said semantic representation.

18. The apparatus of claim 17, wherein said beyond context free grammar formalism includes a feature-based unification grammar.

19. The apparatus of claim 18, wherein said feature-based unification grammar employs variables in defining a feature constraint.

20. The apparatus of claim 18, wherein said feature-based unification grammar is a probabilistic feature-based unification grammar.

21. The apparatus of claim 17, wherein said beyond context free grammar formalism includes a general rewrite grammar.

22. The apparatus of claim 17, wherein said beyond context free grammar formalism includes a tree adjoining grammar (TAG).

23. The apparatus of claim 22, wherein said tree adjoining grammar (TAG) is a probabilistic tree adjoining grammar.

24. The apparatus of claim 17, wherein said beyond context free grammar formalism includes a probabilistic grammar.

25. A computer-readable medium having stored thereon a plurality of instructions, the plurality of instructions including instructions which, when executed by a processor, cause the processor to perform the steps comprising of:
   (a) receiving a speech signal from a user;
   (b) performing speech recognition on said speech signal to produce a text signal representative of words contained in the speech signal;
   (c) providing said text signal to a VoiceXML interpreter;
   (d) using a parser that employs a beyond context free grammar formalism to generate a semantic representation for said text signal; and
   (e) providing said semantic representation to said VoiceXML interpreter.

26. The computer-readable medium of claim 25, wherein said beyond context free grammar formalism includes a feature-based unification grammar.

27. The computer-readable medium of claim 26, wherein said feature-based unification grammar employs variables in defining a feature constraint.

28. The computer-readable medium of claim 26, wherein said feature-based unification grammar is a probabilistic feature-based unification grammar.

29. The computer-readable medium of claim 25, wherein said beyond context free grammar formalism includes a general rewrite grammar.

30. The computer-readable medium of claim 25, wherein said beyond context free grammar formalism includes a tree adjoining grammar (TAG).

31. The computer-readable medium of claim 30, wherein said tree adjoining grammar (TAG) is a probabilistic tree adjoining grammar.

32. The apparatus of claim 25, wherein said beyond context free grammar formalism includes a probabilistic grammar.

33. Apparatus for performing natural language understanding, comprising:
   a speech recognizer for performing speech recognition on a speech signal to produce a text signal representative of words contained in the speech signal;
   a parser that employs a grammar to generate a semantic representation for said text signal; and
   a VoiceXML interpreter for receiving said text signal and said semantic representation.

34. The apparatus of claim 33, wherein said grammar is a feature-based unification grammar.

35. The apparatus of claim 34, wherein said feature-based unification grammar employs variables in defining a feature constraint.

36. The apparatus of claim 34, wherein said feature-based unification grammar is a probabilistic feature-based unification grammar.

37. The apparatus of claim 33, wherein said grammar is a general rewrite grammar.

38. The apparatus of claim 33, wherein said grammar is a tree adjoining grammar (TAG).

39. The apparatus of claim 38, wherein said tree adjoining grammar (TAG) is a probabilistic tree adjoining grammar.

40. The apparatus of claim 33, wherein said grammar is a probabilistic grammar.

* * * * *